United States Patent
van der Maaden

[15] 3,643,842
[45] Feb. 22, 1972

[54] CLAW MECHANISM FOR ADVANCING A PERFORATED RECORD CARRIER ALONG A PATH

[72] Inventor: Johan van der Maaden, Emmasingel, Eindhoven, Netherlands

[73] Assignee: U.S. Philips Corporation, New York, N.Y.

[22] Filed: Jan. 26, 1970

[21] Appl. No.: 5,707

[30] Foreign Application Priority Data

Jan. 24, 1969 Netherlands..........................6901273

[52] U.S. Cl................................................226/71, 352/191
[51] Int. Cl................................................G03b 1/22
[58] Field of Search..................226/43, 62, 70, 71, 64–66; 352/191, 186, 187

[56] References Cited

UNITED STATES PATENTS 2,371,836   3/1945   Masterson ..............................226/43

Primary Examiner—Allen N. Knowles
Assistant Examiner—Gene A. Church
Attorney—Frank R. Trifari

[57] ABSTRACT

A claw mechanism for advancing a perforated record carrier, in particular a film, in a cinematograph film projector, which mechanism comprises a pivotable arm arranged parallel to the direction of advance and a forked claw member which is arranged at right angles to the direction of advance and is hinged to the arm, the claw member being moved by a continuously revolving crank pin which engages between the teeth of the fork, whilst the arm with the fork can be moved towards and away from the record carrier by means of an electromagnet in order to vary the speed of advance.

6 Claims, 1 Drawing Figure

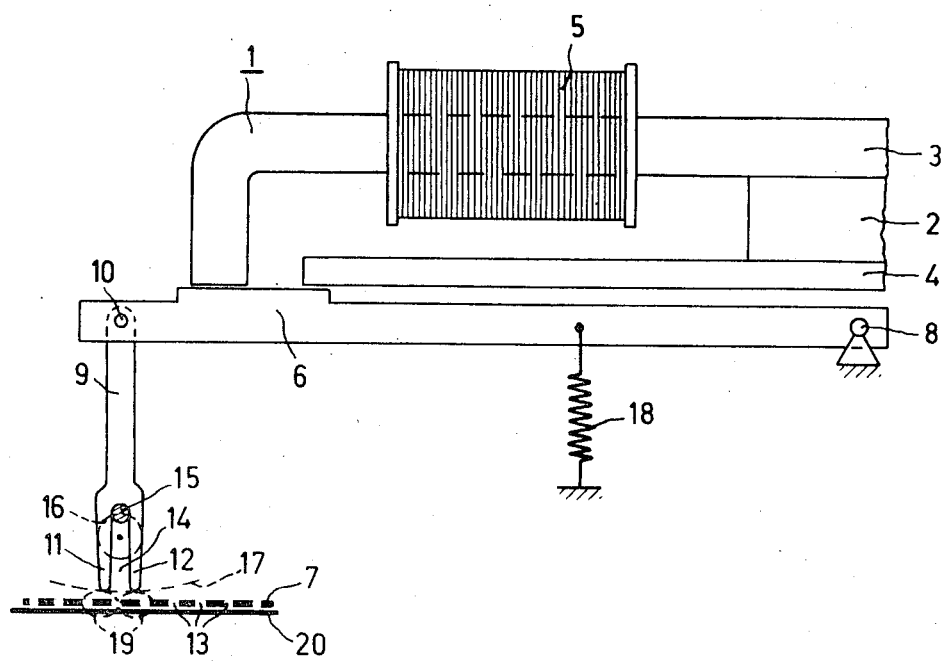
INVENTOR.
JOHAN VAN DER MAADEN
BY
AGENT

CLAW MECHANISM FOR ADVANCING A PERFORATED RECORD CARRIER ALONG A PATH

The invention relates to a claw mechanism for advancing a perforated record carrier along a path. The mechanism comprises a pivoting claw arm which is provided with claw means and is moved by a crank pin mounted on a disc which revolves continuously in operation. An electromagnet having a core and an armature which is coupled with the claw arm, is arranged for pivotal movement about a fixed pivot and can be attracted against the action of a spring. The pivot of the claw arm is movable in directions towards and away from the feed path in accordance with the control of the electromagnet.

A claw mechanism of this kind is described in U.S. Pat. No. 2,371,836. In this known claw mechanism, by which a film is fed forward along a film path in a cinematograph film projector, the magnet armature which extends at right angles to the film path is coupled with the claw arm by two levers hingedly connected to each other. When the magnet coil is energized the armature is attracted against the action of a spring so that the pivot of the claw arm is displaced towards the film path through a distance such that the claw arm driven by the crank pin is engaged with the perforations in the film and the film is advanced. When the magnet coil is not energized the armature is disengaged under the action of the spring and the pivot of the claw arm is held at a distance from the film path such that the film is not advanced. In both positions of the magnet armature the pivot of the claw arm performs a movement under the influence of the continuously rotating crank pin and the claw mechanism forms a four link polygen, the claw mechanism continuously moving in a closed substantially circular path, which has the disadvantage that when the number of frames to be fed forward per unit of time is lower than the normal maximal number determined by the rotary speed of the cam carrying the crank pin and especially when the film is to be advanced one single frame the claw mechanism produces comparatively much noise.

It is an object of the invention to provide an improved claw mechanism for feeding a perforated record carrier along a path whilst avoiding the said disadvantage. For this purpose, according to the invention a claw mechanism of the kind defined above is characterized in that the armature of the electromagnet extends substantially parallel to the feed path and is hingedly connected to the claw arm, the arm being provided with a slot extending substantially at right angles to the feed path and receiving the crank pin of the continuously revolving disc.

The device according to the invention provides that when the armature is in the position, in which the record carrier is not fed forward, the pivot of the claw arm is stationary and the arm only performed a simple swinging movement about this pivot, whilst only in that position of the armature, in which the record carrier is fed forward, the claw mechanism forms the usual four link polygen and the claw means moves in a substantially circular closed path. This provides the advantage that the operation of the claw mechanism is noiseless to a great extent.

A suitable embodiment of the invention consists in that the eccentricity of the crank pin is chosen so that in the nonattracted condition of the armature, in which condition the record carrier is fed forward, at each revolution of the disc the crank pin presents the armature coupled with the claw arm to the magnet in a position in which it nearly contacts the magnet core. By this the airgap between the armature and the magnet is reduced to a minimum at every time, which results in a considerable saving of energy.

In order to save further energy according to the invention the electromagnet core preferably comprises a permanent magnet which is capable of attracting the armature against the action of the spring so as to lift the claw means from the feed path, whilst by energization of the electromagnet a magnetic field can be generated in the core which counter acts the magnetic force of the permanent magnet to a degree such that the armature is disengaged from the magnet under the influence of the spring force and the record carrier can be fed forward through the claw means.

An embodiment of the invention will now be described, by way of example, with reference to the accompanying diagrammatic drawing which is an elevation of a claw mechanism according to the invention.

Referring now to the FIGURE, there is shown an electromagnet 1 which comprises a permanent magnet 2, two soft-iron core parts 3 and 4, a coil 5 which is connected in a nonspecified electric circuit and surrounds the core part 3, and a magnet armature 6 which extends substantially parallel to a perforated record carrier 7 to be advanced along a path 20. One end of the armature is pivoted to a fixed support 8 and the other end is hingedly connected to a claw arm 9 by means of a pin 10. The end of the arm 9 remote from the pin 10 is bifurcated and has a pair of teeth 11 and 12 which can engage with perforations 13 in the record carrier 7 in the manner described hereinafter and which serve to advance this carrier. Between the teeth 11 and 12 a slot 14 is provided which extends substantially at right angles to the path 20 and which receives a crank pin 15 of a disc 16 which in operation is continuously driven by a main drive (not shown).

In the situation shown the armature 6 is held in engagement with the magnet core parts 3 and 4, the magnet coil 5 being not energized. Thus, the armature 6 and the claw arm 9 form a two-part hinged link system the pivot 10 of which is stationary, whilst the crank pin 15 which is free to move in the slot 14 imparts to the claw arm 9 a simple swinging motion relative to the pivot 10 according to a path shown by a broken line 17. In this condition, the teeth 11 and 12 are lifted from the path 20 and hence are disengaged from the perforation 13 so that the record carrier is not fed forward. When the coil 5 is energized a magnetic field is produced which counteracts the field of the permanent magnet. The armature then is pulled by a tension spring 18 secured to it towards the record carrier so that the teeth 11 and 12 engage with the perforations 13 and can describe a substantially circular path 19 and consequently the record carrier can be fed forward. In this situation the claw mechanism forms a four link system. The eccentricity of the crank pin 15 is chosen so that in the nonattracted condition of the armature, with the teeth describing the substantially circular path, during each revolution of the disc 16 the armature 6, which is coupled with the claw arm, is presented to the magnet nearly into engagement with the magnet core parts 3 and 4. According to whether or not the magnet coil is energized according to a chosen program the armature will either assume the fixed position shown in the FIGURE or will be capable of up-and-down movement about the pivot 8 so that the number of frames, for example film pictures, to be fed forward per unit of time by the claw teeth can be varied at will up to a maximum determined by the speed of revolution of the disc 16. The claw mechanism according to the invention is particularly suited for advancing a sinematograph film along a film guide in a projector. However, the invention is not restricted to this specific field of application but in general comprises the feeding forward of any perforated record carrier along a predetermined path.

It should further be noted that the invention is not restricted to the above-described embodiment shown in the drawing. The invention also relates to, for example, an embodiment in which the slot 14 is closed at both ends, in which case the claw means may be of the single-tooth type.

Further, the permanent magnet may, if desired, be replaced by an electromagnet which, in contradistinction to the embodiment shown, when energized attracts or holds the armature.

What is claimed is:

1. A claw mechanism for advancing a perforated record carrier along a path, comprising a pivoting claw arm moved by a crank pin mounted on a disc which revolves continuously in operation, claw means provided on said claw arm, an electromagnet having a core, an armature coupled with the claw arm arranged for pivotal movement about a fixed pivot and can be attracted against the action of a spring, the pivot of the claw arm being movable in directions towards and away from the feed path in accordance with the control of the electromagnet, said armature extending substantially parallel to the feed path and hingedly connected to the claw arm, said arm being provided with a slot extending substantially at right angles to the feed path and receiving the crank pin of the continuously revolving disc.

2. A claw mechanism as claimed in claim 1, wherein the eccentricity of the crank pin is chosen so that in the nonattracted condition of the armature, in which condition the record carrier is advanced, at each revolution of the disc the crank pin presents the armature coupled with the claw arm to the magnet so as to nearly contact the magnet core.

3. A claw mechanism as claimed in claim 1 wherein the electromagnet core includes a permanent magnet which is capable of attracting the armature against the force of a spring so as to lift the claws from the feed path, while by energization of the electromagnet a magnetic field can be produced in the core which counteracts the magnetic force of the permanent magnet to a degree such that the armature is disengaged from the magnet under the influence of the spring force and the record carrier can be fed forward by means of the claws.

4. A claw mechanism for advancing a perforated record carrier along a path comprising a pivotally mounted armature member, a claw arm pivotally attached at one end thereof to said member, a claw means for engagement with said perforated record carrier connected to the other end of said claw arm, means for biasing said member and said claw toward said record carrier, means arranged for cooperative engagement with said claw arm for causing swinging movement of said claw, and control means to allow said biasing means to periodically move said claw arm toward said record carrier so that said claw means will engage the perforated record carrier and cause movement of said record carrier along said path.

5. The claw mechanism according to claim 4 wherein said armature member is arranged substantially parallel to said path and wherein said control means comprises a permanent magnet for attracting said armature away from said record carrier against the action of said biasing means and an electromagnet for periodically counteracting the force of said permanent magnet thereby causing said armature to be moved toward and away from said record carrier.

6. The claw mechanism according to claim 5 wherein said claw means is a bifurcated member having a pair of legs and a slot therebetween, and wherein said means for causing swinging movement of said claw comprises a crank pin eccentrically mounted on a rotating disc, said pin being arranged within said slot so that as said disc rotates said claw is moved back and forth over said record carrier by said pin.

* * * * *